May 4, 1965  E. S. TUPPER  3,181,746
PITCHER AND COVER
Original Filed Jan. 4, 1960
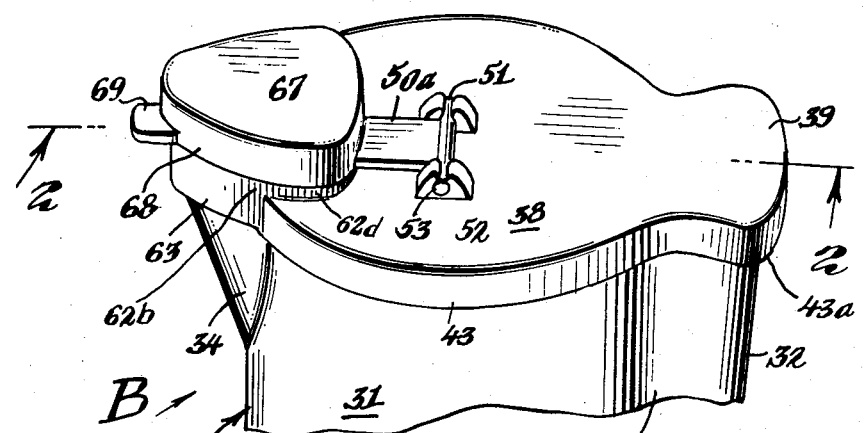
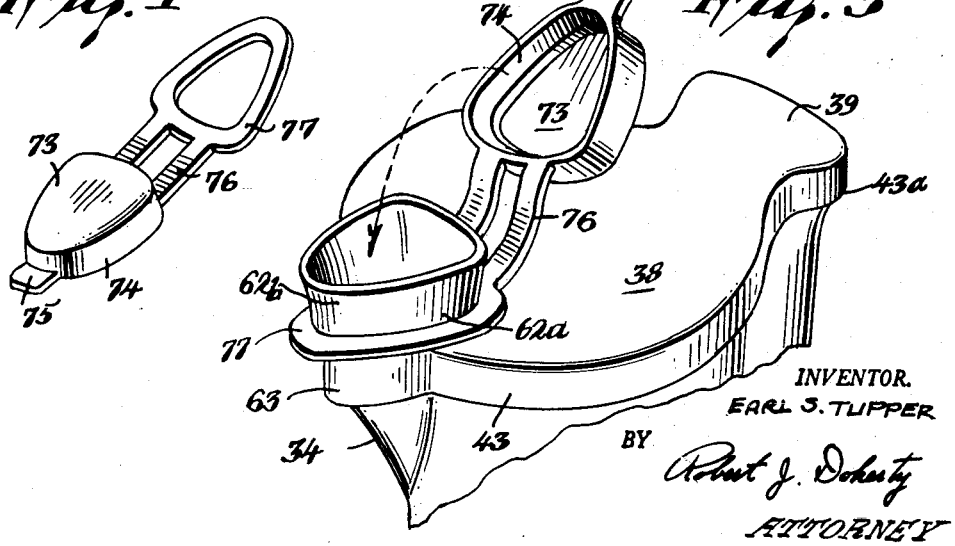
INVENTOR.
EARL S. TUPPER
BY Robert J. Doherty
ATTORNEY

United States Patent Office 3,181,746
Patented May 4, 1965

3,181,746
PITCHER AND COVER
Earl S. Tupper, Esmond, R.I., assignor to Rexall Drug and Chemical Company, Los Angeles, Calif., a corporation of Delaware
Original application Jan. 4, 1960, Ser. No. 297, now Patent No. 3,081,010, dated Mar. 12, 1963. Divided and this application May 16, 1962, Ser. No. 205,140
7 Claims. (Cl. 222—545)

This application is a division of Tupper application Serial Number 297, filed January 4, 1960, now Patent No. 3,081,010.

This invention relates generally to covered hollow vessels including pitchers and canisters provided with independently sealable pouring spout elements; but more specifically to a type of vessel wherein the frictional and sealing joint formed by and between the several members is rigid owing to at least one of the joint cooperating members being formed of a high density olefinic polymer or copolymer.

Such polymers as high density polyethylene and high density polypropylene, at least after a molding operation, afford (1) internal properties of substantial rigidity and (2) surface properties of resilient deformability. Consequently, joints and couplings including such materials afford gasketing effects as has heretofore been disclosed in applicant's invention covered by U.S. Patent No. 2,859,786 and dated November 11, 1958.

An object of the present invention, therefore, is to improve the structure of covered vessels, pitchers and canisters having independently sealable pouring spout elements for efficient, sturdy, safe and durable operation in the disposal, storage and transportation of fluid and comminuted contents of low and high weight loads in household and domestic, industrial, commercial and other fields.

Another object of the invention resides in cover structure in cooperation with the complementary vessel, pitcher or canister structure of all regular and irregular shapes which is effective to afford a rigid, substantially seal-tight and strong joint therewith and wherein said cover structure further affords a spout function in association with the vessel.

This application is a continuation-in-part of U.S. Patents Nos. 2,950,847; 2,842,167 and 2,859,786; and an improvement over applicant's inventions covered in: U.S. Patent No. 2,487,400, dated November 8, 1949; U.S. Patent No. 2,610,490, dated September 16, 1952; U.S. Patent No. 2,764,199, dated September 25, 1956; U.S. Patent No. 2,789,808, dated April 23, 1957; U.S. Patent No. 2,842,-167, dated July 8, 1958.

Although pitchers, canisters, covers and spout elements for storage and dispensing purposes have been and are in present use, drawbacks have been recognized such as loose connections owing to failure of frictional fits, difficult removability or separation of parts, exposure of vessel contents to surrounding atmospheric conditions, inadequate spout closures, decomposition of residual vessel content portions remaining in exposed areas after dispensing and contamination between the vessel contents and the vessel parts, and difficulty in cleaning the cover and spout elements.

Such drawbacks are not only overcome by the instant invention but other objects and advantages of the invention will hereinafter appear in the progress of the disclosure and as pointed out in the appended claims.

Accompanying this specification are drawings showing the invention wherein:

FIGURE 1 is a fragmentary view in perspective of a second form of the invention and showing both the vessel and cover provided with spout elements and the cover with a spout closure, all parts being in closed position;

FIGURE 2 is a sectional view of FIGURE 1 across the plane 12—12 thereof;

FIGURE 3 is a fragmentary view in perspective of the second form as shown in FIGURE 2 with a modified form of spout closure, the latter being in open position;

FIGURE 4 is a view in perspective per se of the spout closure illustrated in FIGURE 3.

The invention illustrated as embodiment B in FIGURES 1 through 4.

Thus, the cover notch opposite spout 34 is indicated by numeral 62 but is provided with a surrounding flared vertical spout engaging wall 62a and an extension 62b thereof beyond cover skirt 43 to serve as a spout mouth extension. Extension 62b has a depending portion 63 joining cover skirt 43 and is provided on the inner face with a rim portion 64 and oppositely sloped sides 65 and 66 to correspond and be continuous with the rim 46 and the oppositely sloped sides 48 and 47 respectively of vessel 30. Portion 63 is adapted to engage the flared edge 35 of spout 34 as seen in FIGURE 2.

A cover for the spout mouth extension 62a–62b–63 is shown in FIGURES 1 and 2 as of the hinge type and consists of a top wall 67, a peripheral skirt 68, a forward engaging tab 69 and a rear tongue 50a carrying pintle 51 for hinged engagement with lugs 52.

The inner face of skirt 68 has a peripheral rim 70 and oppositely sloped walls 71 and 72 for snapping and sealing engagement with the flared walls of spout mouth extension 62a–62b.

A modified and captive type of cover for spout mouth extension 62a–62b is shown in FIGURES 3 and 4. Thus, the cover cap has a top wall 73, a peripheral skirt 74, a front tab 75, and extension strap 76 to permit the cap to be secured to retaining ring 77 at the base of the spout extension 62a–62b on cover member top wall 38.

The vessel, cover and spout closure parts above described may be molded by standard resin-molding techniques. However, when a substantially rigid part is formed of metal, glass, composition or other non-resinous material, the other complementary and engageable part is formed of resinous material as mentioned to effectuate a live, seal-tight, frictional and disengageable joint.

Furthermore, each of said parts is constructed and shaped for easy assemblage and disassemblage with the other parts, for easy accessibility to cleaning and washing, for natural draining or shedding of clinging or residual vessel contents after each use of the device, and for elimination of dirt and vessel content collecting traps.

Additionally, the cover member being engageable with the vessel at a rigid, strong and pressure-resistant joint, same serves as an ice-guard for chilled fluid contents when pouring is effected through the spout of the device.

It is understood that minor changes and modifications in the material, location, integration, shape, size of parts and all types of molding including injection, compression and vacuum may all be resorted to with departing from the spirit of the invention and the scope of the appended claims.

I claim:

1. A container and closure, the combination comprising:
  (a) a container having side and bottom walls and an open top defined by an upper edge of the side wall,
  (b) the upper end of the side wall being flared outwardly,
  (c) a closure having a substantially flat body portion covering at least part of said open top and located wholly above the container upper edge, (d) a downwardly extending flange integral with said closure, (e) said flange having a substantially continuous rib extending inwardly therefrom and spaced from said body portion, (f) the container edge having a periphery greater than the periphery at the juncture of said flange and body portion and greater than the inside periphery of said rib, and (g) said container upper edge being engaged with the underside of the closure body portion and the periphery of the container edge being located at the juncture of said flange and body portion, with said rib located below the container edge.

2. A container and closure according to claim 1 wherein:

(a) said container upper edge is tangentially continuous and curved with portions having dissimilar curvatures from other portions.

3. A container and closure according to claim 1 wherein:

(a) said flange engages said container flared upper end in a tight, frictional and continuous engagement.

4. A container and closure according to claim 1 wherein:

(a) said container and closure are high density olefinic polymers and copolymers.

5. A container and closure according to claim 1 wherein:

(a) said continuous rib is provided by a continuous surface sloping downward and outward from the junction of the flange and body.

6. A container and closure according to claim 1 wherein:

(a) the lower edge of said flange is chamfered upward and inwardly, and (b) said flange being flexed outwardly by forcing the closure down on the container with the container upper edge engaged with and sliding along said chamfered edge until the flared upper end of the container passes over the flange rib.

7. A container and closure, the combination comprising:

(a) a container having side and bottom walls and an open top defined by an upper edge of the side wall, (b) said upper edge being tangentially continuous and curved with portions having dissimilar curvatures from other portions, (c) the upper end and edge of the container side wall being continuously flared outwardly, (d) a closure having a substantially flat body portion covering a major portion of said open top and located wholly above the container upper edge, (e) a downwardly extending flange integral with the periphery of the closure body portion, (f) said flange having a continuous rib extending inwardly therefrom and spaced from said body portion, (g) the container edge having a periphery greater than the periphery at the juncture of said flange and body portion and greater than the inside periphery of said rib, (h) said container upper edge being engaged with the underside of the closure body portion and the periphery of the container edge being located at the juncture of said flange and body portion, with said rib located below the container edge, (i) an opening in said closure body, said opening being located immediately adjacent the periphery of said closure body, (j) a continuous, upwardly extending wall immediately surrounding said opening, at least a portion of said wall being formed by an upward extension of said closure flange, (k) the upper end of said wall being planar and flared outwardly, (l) a cap positionable over the upper end of said wall to close said opening, (m) said cap having a substantially flat body portion and a depending peripheral flange, said flange being engageable with the outside of the flared upper end of said wall, and (n) a connecting unit joining said cap to the closure.

References Cited by the Examiner

UNITED STATES PATENTS

| 2,022,342 | 11/35 | Drood | 222—572 X |
| 2,168,822 | 8/39 | Zink | 222—543 X |
| 2,764,199 | 9/56 | Tupper. | |
| 2,764,200 | 9/56 | Gits | 150—15 |
| 2,805,561 | 9/57 | Emmert et al. | 222—545 X |
| 2,832,517 | 4/58 | Baumgartner | 222—545 |
| 2,886,218 | 5/59 | Marcus | 222—556 X |
| 2,891,704 | 6/59 | Morrison | 222—543 |

LOUIS J. DEMBO, *Primary Examiner.*